(12) United States Patent
Fong et al.

(10) Patent No.: US 6,259,684 B1
(45) Date of Patent: Jul. 10, 2001

(54) CIRCUIT-MODE DATA SERVICE SUPPORT OVER THE A-INTERFACE

(75) Inventors: Mo-Han Fong; Geng Wu, both of Verdun; Duncan Charles Bees, Montreal; Robert Willem Dijkerman, La Prairie, all of (CA)

(73) Assignee: Nortel Networks Limited, Montreal (CA)

( * ) Notice: Subject to any disclaimer, the term of this patent is extended or adjusted under 35 U.S.C. 154(b) by 0 days.

(21) Appl. No.: 09/080,519

(22) Filed: May 18, 1998

Related U.S. Application Data

(60) Provisional application No. 60/046,943, filed on May 19, 1997.

(51) Int. Cl.[7] .............................. H04Q 7/00; H04B 1/38
(52) U.S. Cl. ........................ 370/328; 370/469; 455/560
(58) Field of Search ...................................... 370/310, 328, 370/329, 330, 331, 335, 342, 524, 466, 467, 469, 522; 455/436, 437, 438, 439, 560, 561

(56) References Cited

U.S. PATENT DOCUMENTS 5,936,948 * 8/1999 Sicher .................................. 370/314

* cited by examiner

*Primary Examiner*—Wellington Chin
*Assistant Examiner*—Steven Nguyen
(74) *Attorney, Agent, or Firm*—Bruce Garlick; Richard M. Lehrer; James Harrison

(57) ABSTRACT

An architecture that adapts low speed mobile data over higher speed digital channels, comprising: Intersystem Link Protocol (ISLP) framing structure having ISLP service data units; circuit-mode data carried by the ISLP service data units; a set of call processing and handoff messages, said set including Assignment Request, Assignment Complete, Handoff Required, Handoff Request, and Handoff Request Acknowledge; an indicator incorporated into said set; and digital channels responsive to said indicator to transport the circuit-mode data via the ISLP service data units over an A-interface between a base station (BS) and a mobile switching center (MSC).

12 Claims, 2 Drawing Sheets

CIRCUIT-MODE DATA SERVICE SUPPORT OVER THE A-INTERFACE

REFERENCE TO CO-PENDING PATENT APPLICATIONS

This is a Utility Patent Application Based on Provisional Patent Application Ser. No. 60/046,943 filed May 19, 1997.

BACKGROUND OF THE INVENTION

1. Field of the Invention

The present invention relates to methodologies and structure to support Circuit-Mode Data Services Over the A-interface.

2. Description of Related Art

The A-interface is an interface between the Base Station (BS) and the Mobile Switching Center (MSC) as defined in TIA/EIA/IS-634A. The first public disclosure of the invention was in the form of a contribution to TIA/TR45.4 standard meeting held on May 20–24, 1996; the contribution was subsequently adopted as part of a new TIA/EIA/IS-634A A-interface standard.

Circuit-mode data includes Asynchronous Data and G3 Fax as defined in TIA/EIA/IS-707 and TIA/EIA/IS-135. However, circuit-mode data support over A-interface was not defined in IS-634A prior to submission of the contribution by the inventors.

For Code Division Multiple Access (CDMA) circuit mode data services, a Radio Link Protocol (RLP, as defined in TIA/EIA/IS-707) replaces the vocoder used for voice services, to reliably transport data over the CDMA physical layer. For Time Division Multiple Access (TDMA) circuit mode data services, a Radio Link Protocol (RLP1, as defined in TIA/EIA/IS-130) replaces the vocoder used for voice services, to reliably transport data over the TDMA physical layer.

As in one particular case of the vocoder, RLP resides on the BS for CDMA. In the case of TDMA, RLP1 resides on the Interworking Function (IWF). For an architecture with IWF connected to the MSC, a link layer is between BS and MSC carrying, in the case of CDMA, data between RLP and upper-layers protocol instead of using pulse code modulation (PCM) and, in the case of TDMA, RLP1 data frame instead of using PCM.

This architecture, therefore, necessitates a new procedure and protocol to adapt the low speed mobile data over higher speed digital channels, i.e. DS0S. Each DS0 is a channel of 64 kilobits per second and supports 1 voice call but data is not transmitted across. There are 24 DS0s in a trunk line T1.

For an understanding of protocols and their terminology, refer to Intersystem Link PN-3660 Protocol, V & V Text Rev. 1.3, Copyright 1996 Telecommunications Industry Association. PN-3660 was developed by TR45.2, the TIA Intersystem Operations Subcommittee, and has been accepted into standard TIA/EIA/IS-728.

Terminology understood in the standards and as used in this application include the following:

| | |
|---|---|
| A | Base Station to Mobile Switching Center interface |
| ADS | Asynchronous Data Service |
| BS | Base Station |
| CDMA | Code Division Multiple Access |
| E | Mobile Switching Center to Mobile Switching Center interface |
| GSM | Global System for Mobility |
| ISLP | Intersystem Link Protocol |
| IWF | Interworking Function |
| L | Interworking Function to Mobile Switching Center Interface |
| MS | Mobile Station (may include a Mobile Termination) |
| MSC | Mobile Switching Center |
| PCM | Pulse Code Modulation |
| RLP | Radio Link Protocol |
| SDU | Service Data Unit |
| TDMA | Time Division Multiple Access |
| $U_m$ | Air interface between BS and MS |

Conventional telecommunications standards include:

1. TIA/EIA/PN-3770 Intersystem Operations Support for Data Services, Telecommunications Industries Association, 1997.

2. TIA/EIA/IS-99. Data Services Option Standard for Wideband Spread Spectrum Digital Cellular System. Telecommunications Industry Association, 1995.

3. TIA/EIA/IS-130. 800 MHz Cellular Systems—TDMA Radio Interface—Radio Link Protocol 1. Telecommunications Industry Association, 1995.

4. TIA/EIA/IS-135. 800 MHz Cellular Systems—TDMA Services—Async Data and Fax. Telecommunications Industry Association, 1995.

5. TIA/EIA/IS-707. Data Service Options Support of 14.4 kbit/s Data Rate for Wideband Spread Spectrum Systems. Telecommunications Industry Association, 199x.

6. TIA/EIA/IS-41-C. Cellular Radio Telecommunication Inter System Operations, Telecommunications Industry Association, 199x.

7. TIA/EIA/IS-634-A. MSC-BS Interfaces for Public Mobile and Personal Communication Systems, Telecommunications Industry Association, 1997.

SUMMARY OF THE INVENTION

One aspect of the invention relates to architecture and procedures involving signalling on the A-interface that adopt the Intersystem Link Protocol framing structure for circuit-mode data transport over the A-interface. That is, an architecture that adapts low speed mobile data over higher speed digital channels, that includes Intersystem Link Protocol (ISLP) framing structure having ISLP service data units; circuit-mode data carried by the ISLP service data units; a set of call processing and handoff messages, said set including Assignment Request, Assignment Complete, Handoff Required, Handoff Request, and Handoff Request Acknowledge; an indicator incorporated into said set; and digital channels responsive to the indicator to transport the circuit-mode data via the ISLP service data units over an A-interface between a base station (BS) and a mobile switching center (MSC), where the interworking function (IWF) resides.

The procedure includes a method of adapting low speed mobile data over higher speed digital channels. The method includes signalling over an A-interface between a base station (BS) and a mobile service center (MSC) with Intersystem Link Protocol (ISLP) framing structure having ISLP service data units; carrying circuit-mode data with the ISLP service data units; incorporating an indicator into a set of call processing and handoff messages, the set including Assignment Request, Assignment complete, Handoff Required, Handoff Request, and Handoff Request Acknowledge; and transporting the circuit-mode data via the ISLP service data units over the A-interface between the BS and the MSC.

BRIEF DESCRIPTION OF THE DRAWINGS

For a better understanding of the present invention, is reference is made to the following description and accompanying drawings, while the scope of the invention is set forth in the appended claims.

DESCRIPTION OF THE PREFERRED EMBODIMENT

The contents of provisional patent application Ser. No. 60/046,943 are incorporated herein by reference.

Figure 1A:
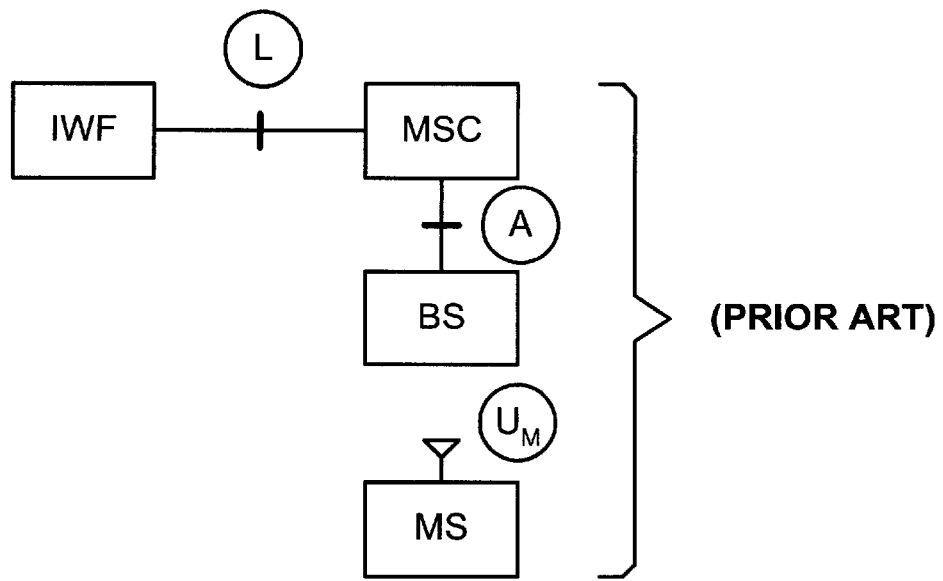
FIG. 1A is a schematic representation of conventional data network architecture with the mobile station not in inter-system handoff, but which is supported by the present invention.
Figure 1B:
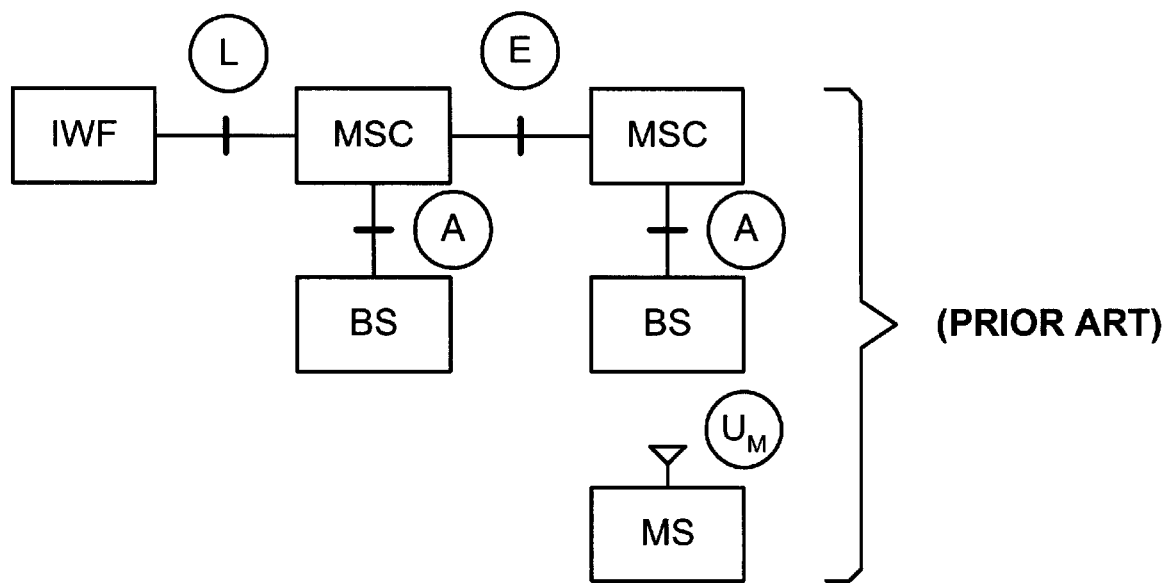
FIG. 1B is a schematic representation of conventional data network architecture with the mobile station in inter-system handoff, but which is supported by the present invention.

FIGS. 1A and 1B show conventional data network architecture defined in TIA/EIA/IS-634A and supported by the present invention and where interworking function IWF resides on the mobile switching center MSC side. FIG. 1A shows the case where the mobile station MS is not in the inter-system handoff and FIG. 1B shows the case where the MS is in the inter-system handoff. FIGS. 1A and 1B also identify the L-interface between the IWF and the MSC, the A-interface between the MSC and the BS. FIG. 1B further identifies the E-interface between two MSCs. In both cases, data is transported along a route between IWF and MS and thus across the L-interface, the E-interface (if present as in FIG. 1B), the A-interface, and the air interface $U_m$.

The present inventors have conceived of procedures, involving signalling over the A-interface, to adopt the Intersystem Link Protocol (ISLP, defined in TIA/EIA/PN-3660 for intersystem support of circuit-mode data) framing structure (PN-3660, section 3) for data transport over the A-interface. That is, adopting the ISLP (PN-3660, section 3) framing structure for data transport between the BS and upper layer protocols located on the MSC side where the Interworking Function (IWF) resides.

Figure 2:
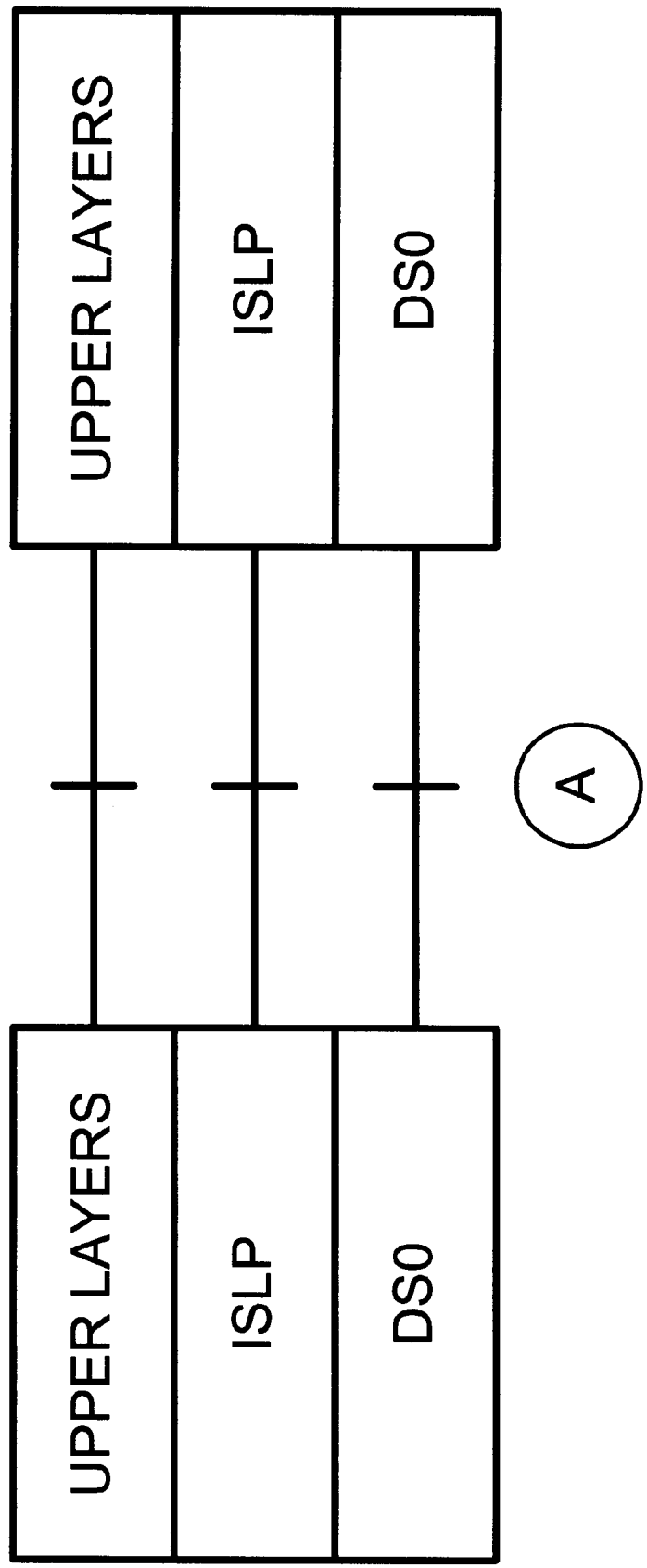
FIG. 2 is a schematic of a communication profile of circuit-mode data over A-interface in accordance with the present invention.

FIG. 2 shows a data communication profile of circuit-mode data over the A-interface using ISLP in accordance with the invention as a link layer to transport data between upper layers protocols at BS and MSC/IWF. For CDMA, ISLP carries data between RLP (defined in TIA/EIA/IS-707) at the BS and TCP/IP/PPP (defined in TIA/EIA/IS-707) at the MSC/IWF. For TDMA, ISLP carries RLP1 (defined in TIA/EIA/IS-130) data frames between BS and MSC/IWF.

Preferably, a maximum size of 1508 octets is used for ISLP Service Data Units (SDUs) carrying CDMA data.

Having defined the framing protocol for data transport over DS0s, additional signalling information between BS and MSC is required for setting up to protocol. Such signalling may be in the form of an indicator.

The indicator may be incorporated for the support of ISLP for data transport, in the following call processing and handoff messages in the standard TIA/EIA/IS-634A: Assignment Request, Assignment Complete, Handoff Required, Handoff Request, and Handoff Request Acknowledge. The indicator signifies that ISLP service data units are carrying circuit mode data, i.e., TDMA or CDMA. Likewise, the present invention has application to Global System for Mobility (GSM) data and other such data types in addition to TDMA and CDMA data as concerns the transport of ISLP SDUs carrying data over the A-interface.

While the foregoing description and drawings represent the preferred embodiments of the present invention, it will be understood that various changes and modifications may be made without departing from the spirit and scope of the present invention.

What is claimed is:

1. An architecture that adapts low speed mobile data over higher speed digital channels, comprising:

Intersystem Link Protocol (ISLP) framing structure having ISLP service data units (SDUs), the ISLP service data units being adapted to carry circuit-mode data;

a set of call processing and handoff messages, said set including Assignment Request, Assignment Complete, Handoff Required, Handoff Request, and Handoff Request Acknowledge;

an indicator incorporated into said set; and digital channels responsive to said indicator to transport the circuit-mode data via the ISLP service data units over an A-interface between a base station (BS) and a mobile switching center (MSC), where interworking function (IWF) resides.

2. The architecture according to claim 1, further comprising a link layer between the BS and MSC carrying data between radio link protocol (RLP) and upper layers protocol instead of through pulse code modulation (PCM) format.

3. An architecture as in claim 1, wherein the ISLP has a maximum size of 1,508 octets for CDMA data.

4. The architecture according to claim 1, further comprising a link layer between the BS and MSC carrying radio link protocol (RPL1) data frame instead of using pulse code modulation (PCM) format.

5. A method of adapting low speed mobile data over higher speed digital channels, comprising:

signalling over an A-interface between a base station (BS) and a mobile switching center (MSC) with Intersystem Link Protocol (ISLP) framing structure having ISLP service data units;

carrying circuit-mode data with the ISLP service data units (SDUs);

incorporating an indicator into a set of call processing and handoff messages, the set including Assignment Request, Assignment Complete, Handoff Required, Handoff Request, and Handoff Request Acknowledge; and transporting the circuit-mode data via the ISLP service data units over the A-interface between the BS and the MSC, where interworking function (IWF) resides.

6. A method as in claim 5, wherein the transporting takes place through a link layer between the BS and the MSC with the service data units carrying the data between radio link protocol (RLP) and upper layers protocol instead of through pulse code modulation (PCM) format.

7. A method according to claim 5, wherein the transporting takes place through a link layer between the BS and MSC with the ISLP service data units carrying radio link protocol (RLP1) data frame instead of using pulse code modulation (PCM) format.

8. A method as in claim 5, wherein ISLP SDU has a maximum size of 1,508 octets.

9. An apparatus adapting low speed mobile data over higher speed digital channels, comprising:

means for signalling over an A-interface between a base station (BS) and a mobile service center (MSC) with Intersystem Link Protocol (ISLP) framing structure having ISLP service data units, the ISLP service data units (SDUs) being adapted to carry circuit-mode data;

an indicator incorporated into a set of call processing and handoff messages, the set including Assignment Request, Assignment Complete, Handoff Required, Handoff Request, and Handoff Request Acknowledge; and means for transporting the circuit-mode data via the ISLP service data units over the A-interface between the BS and the MSC, where interworking function (IWF) resides.

10. An apparatus as in claim 9, wherein the means for transporting includes a link layer between the BS and the MSC with the ISLP service data units adapted to carry the data between radio link protocol (RLP) and upper layers protocol instead of through pulse code modulation (PCM) format.

11. An apparatus according to claim 9, wherein the means for signalling includes a link layer between the BS and MSC with the service data units adapted to carry the data between radio link protocol (RLP1) data frame instead of using pulse code modulation (PCM) format.

12. An apparatus as in claim 9, wherein ISLP SDU has a maximum size of 1,508 octets.

* * * * *